United States Patent
Jacobine et al.

(10) Patent No.: US 9,725,528 B2
(45) Date of Patent: Aug. 8, 2017

(54) PROCESS OF CONTROLLED RADICAL POLYMERIZATION OF BRANCHED POLYACRYLATES

(71) Applicant: Henkel IP & Holding GmbH, Duesseldorf (DE)

(72) Inventors: Anthony Francis Jacobine, North Haverhill, NH (US); John Woods, Farmington, CT (US); David P. Dworak, Middletown, CT (US); Darel Gustafson, Shelton, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/736,902

(22) Filed: Jun. 11, 2015

(65) Prior Publication Data

US 2015/0274851 A1     Oct. 1, 2015

Related U.S. Application Data

(63) Continuation of application No. PCT/US2013/075323, filed on Dec. 16, 2013.

(60) Provisional application No. 61/738,633, filed on Dec. 18, 2012.

(51) Int. Cl.
| | |
|---|---|
| *C08J 5/00* | (2006.01) |
| *C08F 2/38* | (2006.01) |
| *C09K 3/10* | (2006.01) |
| *C08F 4/00* | (2006.01) |
| *C08F 4/06* | (2006.01) |
| *C08F 4/10* | (2006.01) |
| *C08F 220/18* | (2006.01) |
| *C09D 133/08* | (2006.01) |
| *C09J 133/08* | (2006.01) |
| *C08L 33/08* | (2006.01) |
| *C08F 220/10* | (2006.01) |
| *C08K 3/00* | (2006.01) |
| *C08K 5/00* | (2006.01) |

(52) U.S. Cl.
CPC ............... *C08F 2/38* (2013.01); *C08F 4/00* (2013.01); *C08F 4/06* (2013.01); *C08F 4/10* (2013.01); *C08F 220/10* (2013.01); *C08F 220/18* (2013.01); *C08J 5/00* (2013.01); *C08K 3/0008* (2013.01); *C08K 5/0008* (2013.01); *C08L 33/08* (2013.01); *C09D 133/08* (2013.01); *C09J 133/08* (2013.01); *C09K 3/10* (2013.01); *C08F 2220/1825* (2013.01); *C08F 2438/01* (2013.01); *C08J 2333/08* (2013.01); *C09K 2200/0625* (2013.01)

(58) Field of Classification Search
CPC ... C08F 2/28; C08F 220/10; C08J 5/00; C08J 133/08; C09D 133/08; C08K 3/0008; C08K 5/0005
See application file for complete search history.

(56) References Cited

U.S. PATENT DOCUMENTS

| | | | |
|---|---|---|---|
| 6,111,022 | A | 8/2000 | Matyjaszewski et al. |
| 6,538,091 | B1 | 3/2003 | Matyjaszewski et al. |
| 6,541,580 | B1 † | 4/2003 | Matyjaszewski |
| 6,590,049 | B1 | 7/2003 | O'Dwyer et al. |
| 6,838,535 | B2 | 1/2005 | Percec et al. |
| 6,936,656 | B2 | 8/2005 | Muehlebach et al. |
| 8,450,427 | B2 | 5/2013 | Percec |
| 2007/0244265 | A1 | 10/2007 | Matyjaszewski et al. |
| 2007/0276101 | A1 | 11/2007 | Matyjaszewski et al. |
| 2011/0060157 | A1 | 3/2011 | Glaser et al. |
| 2012/0053296 | A1 | 3/2012 | Coffey et al. |

FOREIGN PATENT DOCUMENTS

WO     0056795 A1 †   9/2000

OTHER PUBLICATIONS

International Search Report for International Application No. PCT/US2013/075323 dated Apr. 17, 2014.
Kato et al., Polymerization of Methyl Methacrylate with the Carbon Tetrachloride/Dichlorotris-(triphenylphosphine)ruthenium(II)/Methylaluminum Bis(2,6-di-tert-butylphenoxide) Initiating System: Possibility of Living Radical Polymerization, Macromolecules 1995, vol. 28, pp. 1721-1723.
Konkolewicz, et al.; Polymer Chemistry 2014,5,4396-4417. SARA ATRP or SET-LRP. End of controversy?†

† cited by third party

*Primary Examiner* — Peter D Mulcahy
(74) *Attorney, Agent, or Firm* — Steven C. Bauman

(57) ABSTRACT

The present invention relates to living radical polymerization processes, reaction products of such processes, and compositions containing such reaction products. More particularly, the invention relates to a living radical polymerization to produce branched polymers, in particular branched polyacrylates.

20 Claims, 1 Drawing Sheet

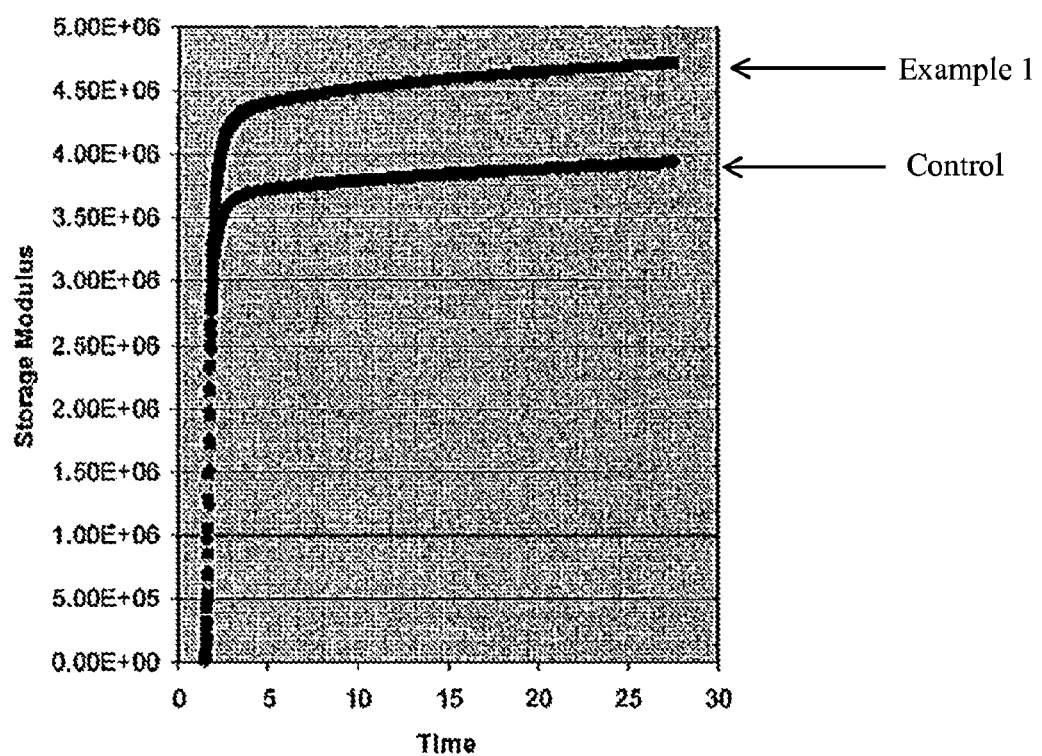

PROCESS OF CONTROLLED RADICAL POLYMERIZATION OF BRANCHED POLYACRYLATES

FIELD OF THE INVENTION

The present invention relates to controlled radical polymerization processes, reaction products of such processes, and compositions containing such reaction products. More particularly, the invention relates to controlled radical polymerization processes that produce branched polymers, in particular branched polyacrylates with a low polydispersity index.

BACKGROUND OF THE INVENTION

There is a constant demand for economic and efficient ways to produce polymers with various properties. Branched polymers are common and are useful to provide beneficial properties, as compared to linear polymers. In particular, branched polymers can confer specific benefit terms of crosslink density, viscosity, tensile strength, elongation, modulus, and the like.

Controlled radical polymerization (hereinafter CRP), including single-electron transfer living radical polymerization (hereinafter SET-LRP) and atom transfer living polymerization (hereinafter ATRP), is a process which produces various polymer products, in high yield, with functional, non-terminated ends, with high molecular weights, and with a low polydispersity index. Thus, CRP has been employed to design a variety of polymer products.

However, typical CRP polymer processes rely on mono-functionalized monomers, and thus, produce linear polymers. Moreover, bulk polymerization produces branched polyarcylates with a broad polydispersity index due to the heat produced during polymerization.

Thus, there exists a need for a CRP polymer process that produces branched polymers with a low polydispersity.

SUMMARY OF THE INVENTION

One aspect of the present invention provides a process of controlled radical polymerization. The process having the steps of: i) performing controlled radical polymerization on a mixture including a polymerizable compound, an initiator, a ligand, and a metal catalyst; ii) permitting the controlled radical polymerization reaction to proceed until a desired level of conversion is attained, but prior to complete conversion, to obtain an intermediate polymerization product; and iii) further reacting the intermediate polymerization product with a multi-functionalized monomer to provide a branched polymer reaction product.

Another aspect of the present invention is a branched polymer reaction product having a polydispersity of about 1.0 to about 1.9. The branched polymer reaction product is formed by a process having the steps of: i) performing controlled radical polymerization on a mixture including a polymerizable compound, an initiator, a ligand, and a metal catalyst; ii) permitting the controlled radical polymerization reaction to proceed until a desired level of conversion is attained, but prior to complete conversion, to obtain an intermediate polymerization product; and iii) further reacting the intermediate polymerization product with a multi-functionalized monomer to provide a branched polymer reaction product.

A further aspect of the present invention is an adhesive, sealant, or coating composition containing branched polymer reaction product having a polydispersity of about 1.0 to about 1.9. The branched polymer reaction product formed by a process having the steps of: i) performing controlled radical polymerization on a mixture including a polymerizable compound, an initiator, a ligand, and a metal catalyst; ii) permitting the controlled radical polymerization reaction to proceed until a desired level of conversion is attained, but prior to complete conversion, to obtain an intermediate polymerization product; and iii) further reacting the intermediate polymerization product with a multi-functionalized monomer to provide a branched polymer reaction product.

BRIEF DESCRIPTION OF THE DRAWINGS

FIG. 1 is a log-log plot of complex shear modulus versus time for composition of Example 1 versus a linear control.

DETAILED DESCRIPTION OF THE INVENTION

There exists a need for a method of controlled radical polymerization that produces branched polymers. The typical CRP process uses initiators and mono-functional acrylate monomers that result in linear polyacrylate architectures. The mechanism of the polymerization does not allow for branched structures to be produced. By incorporating di- or tri-functional acrylate monomers into the system a new 'polymerization site' is introduced along the backbone, which will result in branched polymers.

In the processes of the present invention, ATPR or SET-LRP methods may be employed to produce branched polymers. The methods of the present invention allow for greater diversity of polymers (e.g., branched polymers), and thus, a greater control over the properties of the final polymer products such as crosslink density, viscosity, tensile strength, elongation, modulus, and the like.

Also, because this process is well controlled, it can be implemented on a large scale with a high predictability and/or used to tailor the properties of the final polymer products to new degrees, and products can be designed based on their properties. Further, because there is less termination, the structure and composition of the polymer are more precise and the end product has more desirable properties and characteristics to promote a better product. Further, as low levels of catalyst are needed to drive the reaction and lower temperatures are used the purification of the final product is simplified, and at times, becomes unnecessary, and low polydispersity can be achieved.

To achieve the desired result, in the process of the invention, a multi-functionalized monomer is introduced into the reaction mixture to provide a branched polymer chain. In a reaction vessel, a polymerizable compound, an initiator, a ligand, and a catalyst are mixed. A controlled radical polymerization reaction is allowed to proceed until a desired level of conversion is attained, but prior to complete conversion, to obtain an intermediate polymerization product. The intermediate polymerization product is then reacted with a multi-functionalized monomer to provide a branched polymer chain.

The reaction to produce the intermediate polymerization product may be carried out for a period of up to about 12 hours. In certain embodiments, the reaction is carried out for about 2 to about 6 hours, about 4 hours, or about 5 hours.

Upon addition of the multi-functionalized monomer the reaction may be then continued over an additional period of up to about 4 hours. In certain embodiments, the reaction may be continued for about 0.5 hours to about 2 hours or about 1 hour.

In the processes of the present invention, the temperature at which polymerization is carried out may be generally from about 5° C. to about 70° C. For example, between about 23° C., i.e., about room temperature, and about 60° C. or between about 25° C. and about 40° C. In addition, in embodiments of the invention, the temperature during the initial polymerization may differ from the temperature during continued polymerization, and the temperature may be changed during these periods.

The process of the present invention typically results in the conversion of a majority of the monomer(s) into polymer. In certain embodiments, results in the conversion of at least 60% of the monomer(s) into polymer. In certain embodiments, results in the conversion of at least 70% of the monomer(s) into polymer. In certain embodiments, results in the conversion of at least 80% of the monomer(s) into polymer. In certain embodiments, results in the conversion of at least 90% of the monomer(s) into polymer. In certain embodiments, results in the conversion of at least 95% of the monomer(s) into polymer. In certain embodiments, results in the conversion of at least 98% of the monomer(s) into polymer.

The processes of the present invention may be used to produce block copolymers or other copolymers (e.g., terpolymers). Examples of such copolymers are described in the Examples. In making these copolymers, two or more acrylate monomers are used. Each polymerizable compound may be added sequentially to the reaction vessel as part of its own reaction mixture or may be added together as part of a mixture of the two or more monomers and the amine ligand.

As used herein, the terms "halo" and "halogen" are intended to be synonymous, and both are intended to include elements commonly classified as "halogens", such as chlorine, fluorine, bromine, and iodine.

Desirable branched polymers from the inventive process have certain properties and characteristics. For example, the final polymer product should have a high thermal resistance for its use in various applications and fields of technology. Desirably, the final polymer product may be predictably produced to have high functionality on the ends of the polymer, a low polydispersity, and a molecular weight close to the theoretical molecular weight. While values and measurements of these features are provided in the Examples section herein, a brief discussion of each of the properties follows.

The degree of polymerization is the number average molecular weight divided by the weighted average molecular weight of all monomers in the feed, which, in a controlled polymerization, is a linear function of monomer conversion. Controlled Radical Polymerization (hereinafter, "CRP") requires at least the following two conditions: the initiation should be sufficiently fast so that nearly all chains start to grow simultaneously; and little or no chain transfer occurs to increase the total number of chains. It is well known to those skilled in the art of polymers that when the polydispersity index of a polymer is broad, the polymer contains polymeric segments with substantial smaller and larger molecular weight segments than the number average molecular weight of the polymer. On the one hand, low molecular weight segments may have an adverse effect on physical properties of the polymer such as tensile strength, elongation and flexural modulus; while on the other hand, very large molecular weight segments may result in high melt viscosity of the polymer which may produce limitations in the processability of the polymer. Thus, there are distinct advantages when the final polymer has a well defined and narrow polydispersity index. This permits a more predictable polymer product from a property perspective and minimizes the aforementioned disadvantages.

The molecular weight of the branched polymers of the invention is between about 500 grams per mole and 5000,000 grams per mole. For example, between about 5,000 grams per mole and 100,000 grams per mole or 20,000 grams per mole and 55,000 grams per mole.

The present invention provides for predictable end group functionality, i.e. higher efficiency of the desired functionalized end groups may be achieved, with substantially less premature termination reactions which would otherwise result in undesired truncation of the polymer chain, lack of functional end groups and an unpredictable molecular weight of the final product. Reactive halo-functional end groups may undergo reinitiation and further polymerization to produce block copolymers, or may be further functionalized through nucleophilic substitution, elimination or endcapping reactions. The present invention permits efficient and predictable end group functionality in the final polymer product.

It is desirable to have a narrow molecular weight distribution i.e. polydispersity index in the final polymer product. A narrow molecular weight distribution may be achieved from the controlled polymerization in accordance with the present invention, as the chain length, end group functionality, and consistency of the resultant polymer is substantially constant. In achieving a narrow molecular weight distribution, several factors may be promoted. Some factors which contribute to a narrow molecular weight distribution include: (1) a rate of initiation, which is competitive with the rate of propagation (allowing the simultaneous growth of all the polymer chains); (2) the exchange between species of different reactivities being faster than propagation (ensuring that all the active chain termini are equally susceptible to reaction with monomer for a uniform growth); (3) low to no chain transfer or termination; (4) the rate of activation versus deactivation; and (5) a homogenous system where mixing is sufficiently fast (all active centers are introduced at the onset of the polymerization). A polymerization which meets these factors may have a polydispersity close to the theoretical value of the Poisson distribution 1+1/DP. For example, the polydispersity of the branched polymer products of the present methods is generally about 1.9 or less. For example, between about 1.05 and about 1.9 or between about 1.1 and about 1.3.

Another characteristic of the final product is long-lived polymer chains. This refers to all chains retaining their active centers after substantially full consumption of the monomer. Thus, propagation resumes upon the introduction of an additional monomer. This factor enables the preparation of polymers and copolymers with increased molecular weights as well as block copolymers by sequential monomer addition.

Some embodiments of the present invention provide a polymerization process for the control of the microstructure of polymers and copolymers. Some embodiments of the present invention relate to living radical polymerization of halogen-containing and acrylic monomers utilizing organohalide initiators and to the formation of polymers therefrom. The processes of the various embodiments provide final polymer products which have narrow molecular weight distributions, which are obtained by high and efficient conversion and rapid or ultrafast polymerization reactions.

Thus, the final polymer products obtained through the present methods have predictable molecular weights, a low polydispersity index, and high functionalities.

The process of the present invention employs polymerizable components, such as monomers. The polymerizable component may be an acrylate monomer. As used herein, the term "acrylate monomer" includes both acrylate and methacrylate monomers. For example, the acrylate monomer may be represented by the formula $(CH_2=C(R^1)(CO_2R^2)$, wherein $R^1$ is H or $-CH_3$ and $R^2$ is $C_{1-20}$ alkyl, $C_{6-20}$ aryl, or $C_{7-20}$ aralkyl.

The acrylate monomer may be any desired acrylate monomer including, without limitation, such monomers as (meth)acrylic acid monomers such as (meth)acrylic acid, methyl (meth)acrylate, ethyl(meth)acrylate, n-propyl(meth) acrylate, isopropyl(meth)acrylate, n-butyl(meth)acrylate, isobutyl(meth)acrylate, tert-butyl(meth)acrylate, n-pentyl (meth)acrylate, n-hexyl(meth)acrylate, cyclohexyl(meth) acrylate, n-heptyl(meth)acrylate, n-octyl(meth)acrylate, 2-ethylhexyl(meth)acrylate, nonyl(meth)acrylate, decyl (meth)acrylate, dodecyl(meth)acrylate, phenyl(meth)acrylate, toluyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth) acrylate, stearyl(meth)acrylate, glycidyl(meth)acrylate, 2-aminoethyl(meth)acrylate, -(methacryloyloxypropyl) trimethoxysilane, (meth)acrylic acid-ethylene oxide adducts, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl(meth)acrylate, 2-perfluoromethyl-2-perfluoroethylethyl(meth)acrylate, 2-perfluorohexylethyl(meth)acrylate, 2-perfluorodecylethyl(meth)acrylate and 2-perfluorohexadecylethyl(meth)acrylate. Particularly desirable is a methyl acrylate, 2-ethylhexyl acrylate, n-butyl acrylate, methoxy acrylate, lauryl (meth)acrylate, isodecyl (meth)acrylate, inyl halides, (meth)acrylonitrile, styrene, and combinations thereof. However, any (meth)acrylate or (meth)acrylates may be used in the present invention.

The process of the present invention employs one or more metal catalyst. As used herein the term "metal catalyst" means a metal-containing compound or complex that contributes to determining the position of the atom transfer equilibrium and dynamics of exchange between dormant and active species. Thus, the metal catalyst employed should preferably be a good electron donor. Suitable metal catalysts include, for example, Cu(0); $Cu_2S$; $Cu_2Te$; $Cu_2Se$; Mn; Ni; Pt; Fe; Ru; V; and combinations thereof. Similarly, other suitable metal catalysts, including, for example, Au, Ag, Hg, Rh, Co, Ir, Os, Re, Mn, Cr, Mo, W, Nb, Ta, Zn, and compounds including one or more of the foregoing. Preferable, the metal catalyst is elemental copper metal, and its derivatives, such as Cu(O).

The metal catalyst may be in one or more physical forms. For example, the metal catalyst may be a wire, mesh, screen, shavings, powder, tubing, pellet, crystals, or other solid form. The metal catalyst may be a copper wire, a copper mesh, a copper screen, a copper shaving, a copper powder, a copper gauze, a copper sinter, a copper filter, a copper sliver, a copper tubing, copper crystals, copper pellets, a coating of elemental copper on non-reactive materials, and combinations thereof. Preferably, the metal catalyst is a copper mesh.

The process of the present invention employs one or more ligands. As used herein, the term "ligand" means a nitrogen-containing ligand. Such ligands are thought to solubilize the metal catalyst so it is available in its higher oxidation state. Thus, the ligand may drive the polymerization reaction by promoting the mixing of the various components of the reaction mixture on a molecular level. The amine ligands may be any amine ligand, including without limitation, primary, secondary, and tertiary alkyl or aromatic amines, as well as polyamines which may be linear, branched, or dendritic polyamines and polyamides. Suitable amine ligands include, for example, may include tris(2-dimethylaminoethyl)amine (Me6-TREN), tris(2-aminoethyl)amine (TREN), 2,2-bipyridine (bpy), N,N,N,N,N-pentamethyldiethylenetriamine (PMDETA), polyethleneimine (PEI), and many other N-ligands. Preferably the amine ligand is Me6-TREN.

The process of the present invention employs one or more initiator. As used herein, the term "initiator" includes halogen-containing compounds that initiate the free radical reaction and contribute to the number of growing polymer chains in the reaction vessel. For example, the initiator may be a haloform, alpha-haloester, or sulfonyl halide. Further, the initiator may include: diethyl meso-2,5-dibromoadipate, dimethyl 2,6-dibromoheptanedioate, ethylene glycol bis(2-bromopropionate), ethylene glycol mono-2-bromopropionate, trimethylolpropane tris(2-bromopropionate), pentaerythritol tetrakis (2-bromopropionate), 2,2-dichloacetophenone, methyl 2-bromopropionate, methyl 2-chloropropionate, N-chloro-2-pyrrolidinone, N-bromosuccinimide, polyethylene glycol bis(2-bromopropionate), polyethylene glycol mono(2-bromopropionate), 2-bromopropionitrile, dibromochloromethane, 2,2-dibromo-2-cyanoacetamide, α,α'-dibromo-ortho-xylene, α,α'-dibromo-meta-xylene, α,α'-dibromo-para-xylene, α,α'-dichloro-para-xylene, 2-bromopropionic acid, methyl trichloroacetate, para-tolunesulfonyl chloride, biphenyl-4, 4'-disulfonyl chloride, diphenylether-4,4'-disulfonylchloride bromoform, iodoform carbon tetrachloride, benzyl chloride, N-benzyl-2-bromo-2-methyl-propionate, N-phenyl-2-bromo-2-methylpropionamide, N-chloro-2-pyrrolidone, and combinations thereof. In some embodiments, the initiator may be an alkyl, sulfonyl, or nitrogen halide. The nitrogen halide can be also halogenated nylon, peptide, or protein. Alternatively, a polymer containing active halide groups, for example, poly(vinyl)chloride), the chloromethyl group or polychrolomethylsytrene) of the polymers and copolymers can also be used as initiators. Preferably, the halogenated initiator is diethyl meso-2,5-dibromoadipate, dimethyl 2,6-dibromoheptanedioate, or combinations thereof.

The process of the present invention employs one or more multi-functionalized monomer. As used herein, the term "multi-functionalized monomer" means a compound having more than one site at which polymerization and/or further reaction may proceed. The multi-functionalized monomer may be an acrylate monomer. As used herein, the term "acrylate monomer" includes both acrylate and methacrylate monomers. The multi-functionalized acrylate monomer may be any desired multi-functionalized acrylate monomer including, without limitation, such monomers as 1,6-hexanediol diacrylate, 2,2-bis[4-(2 acryloxyethoxy)phenyl] propane, barium methacrylate, bis(2-methacryloxethyl) phosphate, bis(2-methacryloxethyl)-N,N'-1,9-nonylene biscarbamate, 2,2-bis(4-methacryloxphenyl) propane, 2,2-bis [4-(2-hydroxy-3-methacryloxypropoxy)phenyl] propane, 1,4-butanediol diacrylate, 1,3-butanediol dimethacrylate, 1,4-butanediol dimethacrylate, copper (II) methacrylate, trans-1,4-cyclohexanediol dimethacrylate, N,N'-cystaminebisacrylamide, 1,10-decanediol dimethacrylate, 1,4-diacryloylpiperazine, N,N'-diallylacrylamide, diethylene glycol diacrylate, diethlene glycol dimethacrylate, 2,2-dimethylpropanediol dimethacrylate, diproplene glycol dimethacrylate, N,N'-ethylene biscrylamide, ethlene glycol diacrylate, ethlene glycol dimethacrylate, fluorescein dimethacrylate, N,N'-hexamethylenebisacrylamide, 1,6-hexanediol dimethacrylate, magnesium acrylate, N,N'-methlenebisacrylamide, nonanediol dimethacrylate, 1,5-pentanediol dimethacrylate, 1,4-phenylene diacrylate, tetraethylene glycol dimethacrylate, triethlene glycol diacrylate, triethylene glycol dimethacrylate, zinc dimethacrylate, pentaerythritol triacrylate, 1,1,1-trimethylolpropane triacrylate, 1,1,1-trimethylolpropane trimethacrylate, dipentaerythritol pentaacrylate, pentaerythritol tetraacrylate, and combinations thereof.

Preferably, the multi-functionalized monomer is 1,6-hexanediol diacrylate. When added, the multi-functionalized monomer is present in the reaction mixture at about 0.1 mol % to about 10 mol %. For example, from about 0.2 mol % to about 5 mol % or from about 0.1 mol % to about 1 mol %.

The process of the present invention employs one or more solvent. As used herein, the term "solvent" means a compound to reduce viscosity of the reaction mixture, increase conversion of the ligand, and/or promote fast disproportionation of the catalyst in order to facilitate ultrafast polymerization. Further, the solvent is intended to be non-reactive in order to prevent chain transfer, side reactions, or poisoning of the catalyst. Desirable solvents of the present methods include dipolar, protic, or aprotic solvents. Some desired solvents include water, alcohol, natural or synthetic polymeric alcohols, dipolar aprotic solvents, ethylene carbonate, propylene carbonate, ionic liquid, or a mixture thereof. For example, such solvents may include: ethylene glycol, diethylene glycol, triethylene glycol, 2-(2-ethoxyethoxy)ethanol, tetraethylene glycol, glycerine, hydroxyethyl(meth)acrylate (HEMA), phenols, dimethylsulfoxide (DMSO), dimethylforamide (DMF), dimethylacetamide (DMAc), N-methyl-2-pyrrolidone (NMP), ionic liquids, ethylene carbonate, tetraethylene glycol, poly(ethylene glycol), 2-(2-ethoxyethoxy)ethanol, 1,2-dimethoxy ethane, glycerin, methoxyethanol, and propylene carbonate. Suitable alcohols include methanol, ethanol, propanol, isopropanol, butanol, and tert butanol, and other natural and synthetic polymers containing OH groups. Desirably, the solvent or solvent blend chosen does not cause precipitation of the polymer product during the reaction. Desirably, the solvent is methanol, DMSO, or a combination thereof. The solvent is present in the reaction mixture in an amount of about 5% to about 75% by weight of the reaction mixture. For example, between about 5% and about 30% by weight.

The products of the inventive process may be used to provide curable resin compositions useful as adhesives, sealants, or coatings. The polymers of the methods also exhibit good oil resistance, heat resistance, adhesiveness and flexibility. Further, the products encompassed by the methods of the present invention can be widely used as plastics, elastomers, adhesives, pressure sensitive adhesives, emulsifiers, thermoplastic elastomers, etc.

The processes of the present invention may employ and the compositions of the present invention may include additional components to provide one or more desired characteristics to the products of the processes or to the compositions. Suitable additional components include, for example, monomers (in addition to the acrylate monomers described above), polymers, plasticizers, thickening agents, rheology agents, coloring agents, pigments, fillers, additional initiators (other than those described above), and combinations thereof.

EXAMPLES

Example 1: Synthesis of Branched 20K Dibromo Terminated Terpolymer

In preparation for the reaction, a copper mesh was soaked in acetone containing 1000 parts per million (ppm) hydrazine hydrate for 45 minutes.

Ethyl acrylate (160.19 g; 1.60 moles), ethylene glycol methyl ether acrylate (52.06 g, 0.40 moles), n-butyl acrylate (763.89 g, 5.96 moles), DMSO (254.7 g), acetone (183.1 g), tris(2-methylaminoethyl)amine (0.922 g, 0.004 moles), copper(II) bromide (0.089 g, 0.0004 moles), and diethyl meso-2,5-dibromoadipate (14.40 g; 0.04 moles) were added to a double-walled 3 L glass reactor vessel. Prior to sealing the vessel the soaked copper mesh was removed from the acetone/hydrazine hydrate solution, rinsed with acetone, and wrapped securely around a sealed sparge tube. The sparge tube was then held in place above the reaction mixture (in the head space). The reactor was sealed and the reaction mixture was then stirred and heated to 30° C. During heating the reaction mixture was purged with argon by means of a sparge tube for 45 minutes. After the reaction mixture was purged the copper mesh was submerged into the reaction mixture. After an induction time of 5 minutes, the reaction temperature and monomer conversion began to increase rapidly. After reacting for about 4 hours, the reaction temperature and monomer conversion had increased to 34° C. and 80.5% respectively. The copper mesh was then removed from the terpolymer solution and 1,6 hexanediol diacrylate (9.05 g, 0.04 moles) was added and allowed to react for an additional 60 minutes. The polymerization was terminated by purging the terpolymer solution with air for 30 minutes.

The structure of the polymer was confirmed by chromatographic and spectroscopic analyses. Size exclusion chromatography (SEC: THF; 1 mL/min; RI detector; PMMA calibration) indicated number average molecular weight (Mn) of 23,238 and polydispersity of 1.10. Residual bromide by x-ray fluorescence showed 7,762 ppm bromine, which closely corresponds to the theoretical value, i.e., 7,988 ppm bromine The polymer was also subjected to photorheometry, physical testing and compression set (see FIG. 1 and Tables 1 and 2 below). The polymer samples were formulated in accordance with the present invention according to the following composition: 55.5% polymer, 17.5% N,N-dimethylacrylamide, 14% HDK 3ORY, 5% isodecyl acrylate, 5% TegMer 809, 1% Vulkanox ZMB-2c5, 1% Irganox B215, and 1% Irgacure 2022. Formulations are loaded onto a TA 200EX photorheometer having a parallel plate configuration. The top plate is aluminum with a diameter of 8 mm, and the bottom plate is quartz. Initial gap is set at 1.000 mm. The oscillatory experiment used to monitor cure applies a strain of 0.04% at an angular frequency of 30 rad/s. The light source used was an EXFO Omnicure 2000 with an effective irradiance of 10 mVV/cm$^2$; the lamp is turned on at t=15 sec and left on throughout the remainder of the experiment. As the top plate oscillates in the x-y direction, the force in the "z" direction (labeled the "normal force", or FN) was kept at 0.N; if the sample shrunk during cure, the gap was reduced accordingly to ensure no loss of contact at the interfaces. Data was reported as a log-log plot of complex shear modulus versus time (FIG. 1). The 'Control' is Kaneka's resin XX039C, which is an acrylate functionalized telechelic polyacrylate of similar backbone composition and molecular weight to the resin tested.

For tensile and elongation testing the entire composition was mixed in a DAC 400 FVZ speed mixer for 3 minutes at 2500 rpm. Standard 5×5×0.075 inch test sheets were prepared between polyethylene release sheets and cured by irradiating for 30 seconds per side (60 a total) in a Zeta 7216 UV chamber at an effective irradiance of 100 mW/cm$^2$ UVA as measured by a EIT Power Puck. From the test sheets, dogbone tensile specimens and compression set discs were pressed. The tensile dogbones were pulled in an instron at a crosshead speed of 20 inches/minute. according to ASTM D412 (Table 1).

TABLE 1

Results of Tensile and Elogation Testing vs. Control

| Resin | Tensile (psi) | SD | Elongation (%) | SD |
|---|---|---|---|---|
| Control | 902.747 | 94.581 | 230.1 | 19.5 |
| Inventive | 829.395 | 115.552 | 146.8 | 21.6 |

The compression set discs were stacked to give an initial thickness ($t_1$) of between 0.466 and 0.530 inches; they were then compressed by 25% ($t_c$=75% of initial thickness) and placed in a 150° C. oven for 70 hours. After removal from the oven and compression, the final thickness ($t_1$) was measured, and compression set was reported (Table 2) according to the equation:

$$C_B(\%) = \frac{(t_1) - (t_f)}{(t_1) - (tc)} \times 100$$

TABLE 2

Results of Compression Set vs. Control

| Resin | Initial Thickness (in) | Compressed To (in) | Final Thickness (in) | Conpression set (%) |
|---|---|---|---|---|
| Control | 0.44 | 0.355 | 0.4114 | 33.6 |
| Inventive | 0.4292 | 0.355 | 0.408 | 28.6 |

Example 2: Synthesis of Branched 30K Terpolymer

In preparation for the reaction, a copper mesh was soaked in acetone containing 1000 parts per million (ppm) hydrazine hydrate for 45 minutes.

Ethyl acrylate (182.02 g; 1.82 moles), ethylene glycol methyl ether acrylate (59.15 g; 0.45 moles); n-butylacrylate (872.63 g, 6.81 moles), dimethysulfoxide (290.6 g), acetone (209.0 g), tris(2-methylaminoethyl)amine (0.692 g, 0.003 moles), copper (II) bromide (0.067 g, 0.0003, moles), and diethyl-meso-2,5-dibromadipate (10.80 g; 0.03 moles) were added to a double-walled 3 L glass reactor vessel. Prior to sealing the vessel the soaked copper mesh was removed from the acetone/hydrazine hydrate solution, rinsed with acetone, and wrapped securely around a sealed sparge tube. The sparge tube was then held in place above the reaction mixture (in the head space). The reactor was sealed and the reaction mixture was then stirred and heated to 30° C. During heating the reaction mixture was purged with argon by means of a sparge tube for 45 minutes. After the reaction mixture was purged the copper mesh was submerged into the reaction mixture. After an induction time of 5 minutes, the reaction temperature and monomer conversion began to increase rapidly. After reacting for about 5 hrs, the reaction temperature and monomer conversion had increased to 34° C. and 80.8% respectively. The copper mesh was then removed from the terpolymer solution and 1,6 hexanediol diacrylate (2.06 g, 0.0091 moles) was added and allowed to react for an additional 60 minutes. The polymerization was terminated by purging the terpolymer solution with air for 30 minutes.

The polymer was analyzed by chromatographic and spectroscopic analyses. Size exclusion chromatograph (SEC; THF; 1 mL/min; RI detector; PMMA calibration) indicated number average molecular weight (Mn) of 31,638 and a polydispersity of 1.09.

What is claimed is:

1. A process of controlled radical polymerization, comprising the steps of:
    i) performing controlled radical polymerization on a mixture comprising a mono-functional acrylate monomer, an initiator, a ligand, and a metal catalyst;
    ii) permitting the controlled radical polymerization reaction to proceed until a desired level of conversion is attained, but prior to complete conversion, to obtain an intermediate polymerization product; and
    iii) further reacting the intermediate polymerization product with an acrylate monomer having multiple acrylate functional groups to provide a branched polymer chain.

2. The process of claim 1, wherein the controlled radical polymerization is a single electron transfer living radical polymerization.

3. The process of claim 1, wherein the acrylate monomer having multiple acrylate functional groups is selected from the group consisting of 1,6-hexanediol diacrylate, 1,6-hexanediol dimethacrylate, 1,4-butanediol diacrylate, 1,3-butanediol dimethacrylate, 1,4-butanediol dimethacrylate, trans-1,4-cyclohexanediol dimethacrylate, N,N'-diallylacrylamide, diethylene glycol diacrylate, diethylene glycol dimethacrylate, 2,2-dimethylpropanediol dimethacrylate, dipropylene glycol dimethacrylate, ethylene glycol diacrylate, ethylene glycol dimethacrylate, N,N'-hexamethylene bisacrylamide, 1,5-pentanediol dimethacrylate, 1,4-phenylene diacrylate, pentaerythritol triacrylate, 1,1,1-trimethylolpropane triacrylate, 1,1,1-trimethylolpropane trimethacrylate, dipentaerythritol pentaacrylate, pentaerythritol tetraacrylate, and combinations thereof.

4. The process of claim 1, wherein said mono-functional acrylate monomer is a (meth)acrylate monomer is selected from the group consisting of (meth)acrylic acid, methyl (meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl (meth)acrylate, nonyl(meth)acrylate, decyl(meth)acrylate, dodecyl(meth)acrylate, phenyl(meth)acrylate, toluyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, [−](methacryloyloxypropyl)trimethoxysilane, (meth)acrylic acid-ethylene oxide adducts, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl (meth)acrylate, perfluoromethyl(meth)acrylate, diperfluoromethylmethyl(meth)acrylate, 2-perfluoromethyl-2-perfluoroethylethyl(meth)acrylate, 2-perfluorohexylethyl (meth)acrylate, 2-perfluorodecylethyl(meth)acrylate and 2-perfluorohexadecylethyl(meth)acrylate, and combinations thereof.

5. The process of claim 1, wherein said mono-functional acrylate monomer is a member selected from the group consisting of n-butyl acrylate, methyl methacrylate, methoxy ethylacrylate, ethyl acrylate, (meth)acrylonitrile, and combinations thereof.

6. The process of claim 1, wherein said initiator is selected from the group consisting of mono-halogenated compounds, poly-halogenated compounds, and combinations thereof.

7. The process of claim 1, wherein the initiator conforms to the formulas R—X or R'C(=O)OR, wherein X is a halogen and R is $C_1$-$C_6$ alkyl.

8. The process of claim 1, wherein the initiator is selected from the group consisting of diethyl meso-2,5-dibromoadipate, dimethyl 2,6-dibromoheptanedioate, ethylene glycol bis(2-bromopropionate), ethylene glycol mono-2-bromopropionate, trimethylolpropane tris(2-bromopropionate), pentaerythritol tetrakis (2-bromopropionate), 2,2-dichloacetophenone, methyl 2-bromopropionate, methyl 2-chloropropionate, N-chloro-2-pyrrolidinone, N-bromosuccinimide, polyethylene glycol bis(2-bromopropionate), polyethylene glycol mono(2-bromopropionate), 2-bromopropionitrile, dibromochloromethane, 2,2-dibromo-2-cyanoacetamide, α,α'-dibromo-ortho-xylene, α,α'-dibromo-meta-xylene, α,α'-dibromo-para-xylene, α,α'-dichloro-para-xylene, 2-bromopropionic acid, methyl trichloroacetate, para-tolunesulfonyl chloride, biphenyl-4,4'-disulfonyl chloride, diphenylether-4,4'-disulfonylchloride bromoform, iodoform carbon tetrachloride, and combinations thereof.

9. The process of claim 1, wherein the initiator is diethyl meso-2,5-dibromoadipate or dimethyl 2,6-dibromoheptanedioate.

10. The process of claim 1, wherein the ligand is selected from the group consisting of primary alkyl or aromatic amines, secondary alkyl or aromatic amines, tertiary alkyl or aromatic amines, linear polyamines, branched polyamines, dendritic polyamines, polyamides and combinations thereof.

11. The process of claim 1, wherein the ligand is selected from the group consisting of tris(2-dimethylaminoethyl) amine, tris(2-aminoethyl)amine, 2,2-bipyridine N,N,N,N,N-pentamethyldiethylenetriamine, and combinations thereof.

12. The process of claim 1, wherein the metal catalyst is selected from the group consisting of Cu(0), $Cu_2S$, $Cu_2Te$, $Cu_2Se$, Mn, Ni, Pt, Fe, Ru, V, Au, Ag, Hg, Rh, Co, Ir, Os, Re, Mn, Cr, Mo, W, Nb, Ta, Zn and combinations thereof.

13. The process of claim 1, wherein the metal catalyst is Cu(0).

14. The process of claim 1, wherein the branched polymer chain from the process has a polydispersity of about 1.0 to about 1.3.

15. A branched polymer compound having a polydispersity of about 1.3 or less.

16. A branched polymer reaction product having a polydispersity of about 1.0 to about 1.9 formed by a process having the steps of:
   i) performing controlled radical polymerization on a mixture comprising a mono-functional polymerizable component, an initiator, a ligand, and a metal catalyst;
   ii) permitting the controlled radical polymerization reaction to proceed until a desired level of conversion is attained, but prior to complete conversion to obtain an intermediate polymerization product; and
   iii) further reacting the intermediate polymerization product with an acrylate monomer having multiple acrylate functional groups to provide a branched polymer chain.

17. An article of manufacture comprising the branched polymer reaction product of claim 16.

18. An adhesive, sealant, or coating composition comprising:
   (a) a branched polymer reaction product having a polydispersity of about 1.0 to about 1.9 formed by a process having the steps of:
      i) performing controlled radical polymerization on a mixture comprising a mono-functional acrylate monomer, an initiator, a ligand, and a metal catalyst;
      ii) permitting the controlled radical polymerization reaction to proceed until a desired level of conversion is attained, but prior to complete conversion to obtain an intermediate polymerization product; and
      iii) further reacting the intermediate polymerization product with an acrylate monomer having multiple acrylate functional groups to provide a branched polymer chain.

19. The composition of claim 18, further comprising a cure system.

20. The composition of claim 18, further comprising a component selected from the groups consisting of monomers, polymers, plasticizers, thickening agents, rheology agents, coloring agents, pigments, fillers, initiators, and combinations thereof.

* * * * *